July 19, 1949.  F. L. MURPHY ET AL  2,476,451
VEHICLE SHEATHING ARRANGEMENT
Filed July 10, 1944  9 Sheets-Sheet 5

July 19, 1949.  F. L. MURPHY ET AL  2,476,451
VEHICLE SHEATHING ARRANGEMENT
Filed July 10, 1944  9 Sheets-Sheet 6

July 19, 1949.  F. L. MURPHY ET AL  2,476,451
VEHICLE SHEATHING ARRANGEMENT
Filed July 10, 1944  9 Sheets-Sheet 9

Inventors:
Frank L. Murphy, &
James E. Candlin, Jr.
By Oscar Hochberg, Atty.

Patented July 19, 1949

2,476,451

UNITED STATES PATENT OFFICE 2,476,451

VEHICLE SHEATHING ARRANGEMENT

Frank L. Murphy and James E. Candlin, Jr., Chicago, Ill., assignors to Pullman-Standard Car Manufacturing Company, Chicago, Ill., a corporation of Delaware Application July 10, 1944, Serial No. 544,219

9 Claims. (Cl. 189—86)

1

The invention relates to a sheathing arrangement for vehicles designed to protect the walls thereof from corrosion and deterioration resulting from exposure to the elements to prolong the useful life and enhance the appearance of the vehicle.

A principal object is to provide a sheathing panel assembly comprising a plurality of panels formed for interlocking joint relationship with means at the joints for detachably securing the several panels to the vehicle wall, and stress means intermediate the joints to provide tension in the respective panels to insure pressure at the joints to render them weather-tight and free from vibration.

One object is to provide a sheathing formed to facilitate attachment thereof to a vehicle wall from the outside of the vehicle in such fashion as to conceal the fastening means and to rigidify such wall.

An important object is to provide sheathing members formed to permit fabrication by the extrusion process wherein such members would be produced by forcing plastic metal under high pressure thru a die having an aperture of the contour desired whereby the panels thus formed would possess accurately gaged definition of contour, free from irregularities, practicable for interlocking with associated members having like characteristics, and the further advantage that the elements entering into the panel construction are integrated with resultant saving in weight of material and cost of fabrication.

The foregoing and other objects and advantages of the invention will appear from the following description taken in connection with the accompanying drawings, in which—

2

Figure 1:
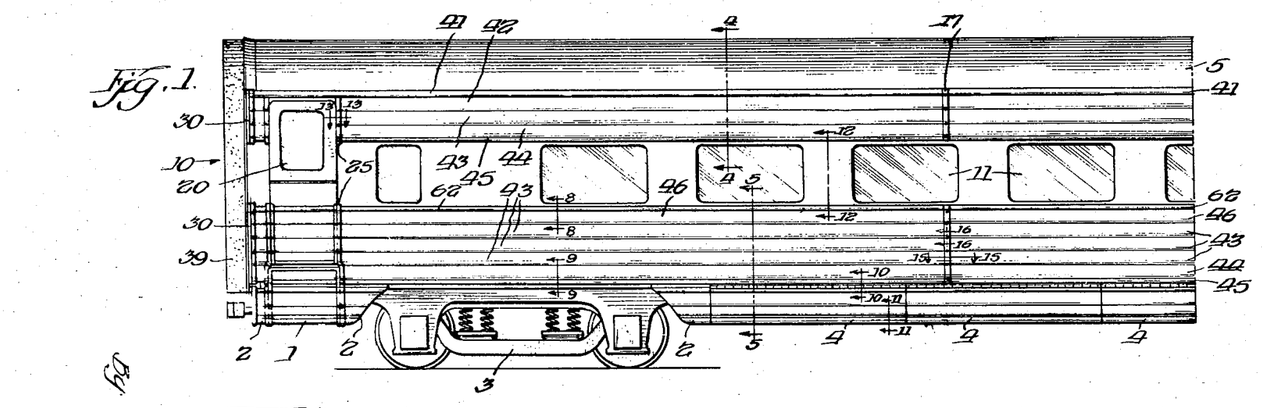
Figs. 1 and 2 are complemental side elevational views of a railway vehicle embodying the side wall sheathing arrangement of the invention, showing a preferred application of the sheathing the full length of the vehicle above and below the windows and depicting application of similar sheathing to the depending side aprons of the vehicle.
Figure 2:
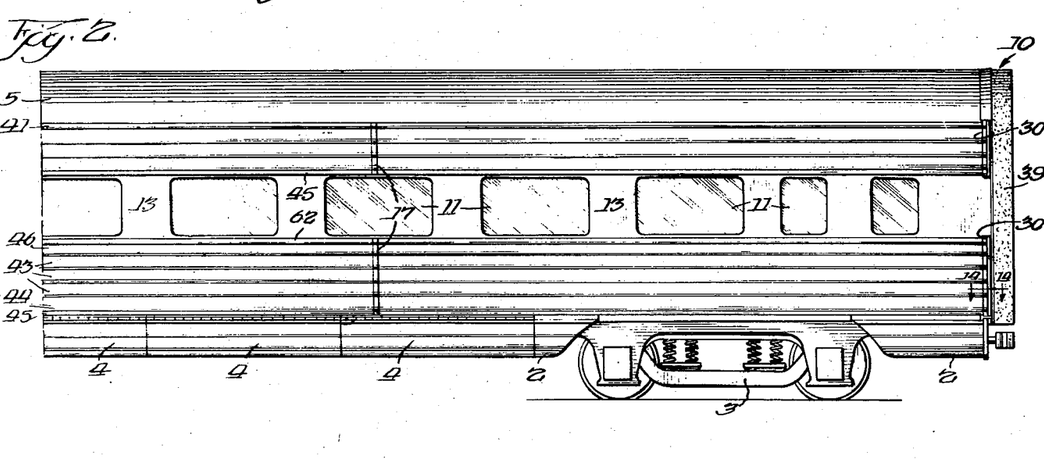
Figure 12:
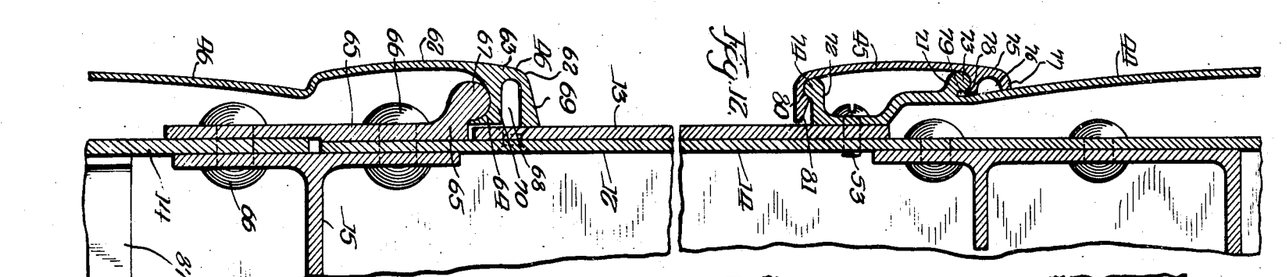
Fig. 12 is a vertical cross-sectional view taken on line 12—12, of Fig. 1, through the girder side plate at the pier post position between the windows and extending from the belt rail to window headers, showing in one embodiment of the invention, a finish panel of metal similar to that of the shaped members of the sheathing for covering the girder plate portion between the windows, depicting also the method of securing the sheathing members at the belt rail and header positions to the girder plate.

In said drawings, the use of the sheathing of the invention is best exemplified by its application to the side of a railway car 10 as shown in Figs. 1 and 2. The sheathing as a whole is preferably disposed to cover the car side wall areas above and below the windows 11 and, if desired, at the pier post positions 12 between the windows, the sheathing members above and below the windows being preferably shaped for purposes hereinafter outlined, while those between the windows may be in the form of flat panels 13 arranged to overlie the pier panel portion 12 of the girder wall plate 14 above the belt rail 15, as best shown in Fig. 12. The sheathing members above and below the windows are severally of less length than the car side to facilitate handling in the application of the sheathing to the wall and are preferably spliced at contiguous ends intermediate the car ends, as best shown in Figs. 1, 2, 15 and 16; the sheathing members are removably held to the girder plate 14 by means of screws or bolts 16 extending between adjacent ends of the sheathing members and thru the splice plate 17 and the sealing strip 18 for securing said ends without perforating the sheathing members, the spice plate and the strip conforming to the contour of the sheathing to insure weather-tight engagement. The ends of the sheathing members at the vestibule door position and the corner post at opposite ends of the car are held as shown respectively in Figs. 13 and 14; at the vestibule door 20, a door jamb casing piece 21, secured to body framing post 22, is formed with the flange portion 23 positioned in the plane of the girder plate 14 with portion thereof extended beyond the post to define the door opening 24 and to provide an attaching plate for the sheathing retaining clamp 25; the clamp piece is angle-shaped and disposed with one flange portion 26 conforming to and engaging the sheathing members with the interposed sealing strip 27 and the other flange 28 having edge abutment with the casing piece 21 flush with the door opening 24, as shown, the clamp being secured by means of screws or bolts 29 extending thru the flange 26 and the flange 23 of the door jamb casing. The sheathing ends at the corner post position at the opposite end of the car are secured by a similar retaining clamp 30 but of Z shape with one flange portion 31 conforming to and engaging the sheathing members with the interposed sealing strip 32; as in the case of the clamp 25, the attaching screw or bolt 33 is disposed adjacent the ends of the sheathing members to avoid penetrating them to insure weather-tight engagement of the parts; the bolt extends through the flange 31, the plate 34 positioned in the plane of the girder plate 14, and the corner post 35; the plate 34 is extended beyond the post to provide an abutment for the clamp flange 36 through web portion 37 transmitting pressure of the bolt to the plate 34. In the particular embodiment shown the plate 34 functions also as a retaining piece for the streamlining diaphragm 39 to complement the retaining clamp 40 held to the post by the bolt 38.

In a railway car construction involving girder side and framing assemblies of aluminum or steel in the side wall structure, exposure of such metal to the deleterious action of the elements has resulted in discoloration and sometimes corrosion sufficient to detract from established standards of maintenance and appearance of such vehicles. Therefore, to protect the surface of the girder wall in areas not lending themselves to a particular decorative treatment by painting or other surface embellishment alone, and to provide means to further stiffen the wall structure, sheathing in the form of prefabricated members 41 through 46, in the present embodiment, disposed and applied as presently to be described, is provided. Preferably, the sheathing members are proportioned to permit grouping of desirable odd numbers so that required lettering above and below the windows could be accommodated by a sheathing member centrally positioned in the group, in the present case, by members 43 as shown in Figs. 1 through 5, of the drawings. In the instant disclosure, the sheathing members are of extruded metal and provide necessary interlocking and attaching means at opposite margins of the respective members and with integral portions preferably in the form of tensioning ribs 47 extending longitudinally of certain of said members intermediate the margins and in parallel relationship. The members may be of any desired contour dependent upon the type of car or wall structure and finish decided upon; the surface may be formed with plane faces in angular relation, or, as here shown, of arcuate configuration, either convex or concave, to further rigidify the construction. The sheathing herein contemplated is characterized by a surface finish which is very hard and corrosion resistant, free from scratches and easy to clean, and resilient within the elastic limits of the material to compensate for variations in stresses imposed in the process of attaching the members to the car. In order fully to prevent the entrance of moisture through the joints between associated sheathing members, certain of them are formed with elongated pockets 48, to receive the cooperating flanges 98 on the contiguous underlying members in interlocking relationship.

Provision is made for application of the members to the girder side 14 by the attaching flanges 51 forming downward extensions of the offset inner wall portions of the respective pockets 48; the flanges are drilled to provide the openings 52 suitably spaced along the flanges for receiving securing devices such as the screws or bolts 53 adequate to retain the sheathing members in position on the girder 14 when the members are stressed as hereinafter explained. In order to insure weather-tight joints at the interlocking pockets 48 and the cooperating flanges 98 and prevent chattering of these parts, the joint is tightened by the application of pressure induced by the stress ribs 47 designed to bear against the girder plate 14 to function as a strut to maintain tension in the body of the several sheathing members when the sheathing is secured in position on the girder. The strut is preferably inclined to shed any water which might enter the space between sheathing and girder wall and provided with a bearing flange 54 for extended pressure engagement with the girder wall; to obtain sufficient pressure at the joints to insure a firm interlock between the members, pressure between strut and the girder may be regulated by the simple expedient of interposing a shim strip 55 between the strut and girder, such strip being preferably non-metallic to cushion the parts against chattering of metal to metal contact.

In the preferred form the sheathing members extend with their exposed outer faces downwardly from the upper ledge portion 61 to the lower margin and terminate in thickened bead portions 91 to provide the outer wall portion of an elongated hollow pocket 48 further defined by a companion inner wall portion 92 extending inwardly and downwardly from the inner face of the body section at a point immediately above the bead 91, to a plane adjacent the girder wall at which point the wall is further bent to provide a depending attaching flange 51 thickened to stiffen the member and to permit drilling of the openings 52 for the attachment means. A portion of the attaching flange 51 between the bend and the openings 52 is offset outwardly as at 93 to provide an inner wall 94 inclined in substantially parallel spaced relationship with the inner bearing face portion 95, also inclined, of a section bead 91 on the outer wall of the pocket 48 and together defining passageway 96 between them to receive the offset flange 98 at the upper margin of an associated underlying member. The width of the passageway 96 with respect to the thickness of flange 98 is preferably so proportioned as to cause the spreading apart of the walls 91 and 94 under thrust of the flange 98 entered between them for interlocking with the underlying members during the process of assembling them on the car wall. To render inconspicuous the seam 97 between the members and to insure a weather-tight joint, the downwardly facing shoulder 60 is sloped upwardly and inwardly with respect to the underlying ledge 61 of an associated member to provide a line contact at the junction of adjoining members.

Figures 4, 5, 15, 16, 23:
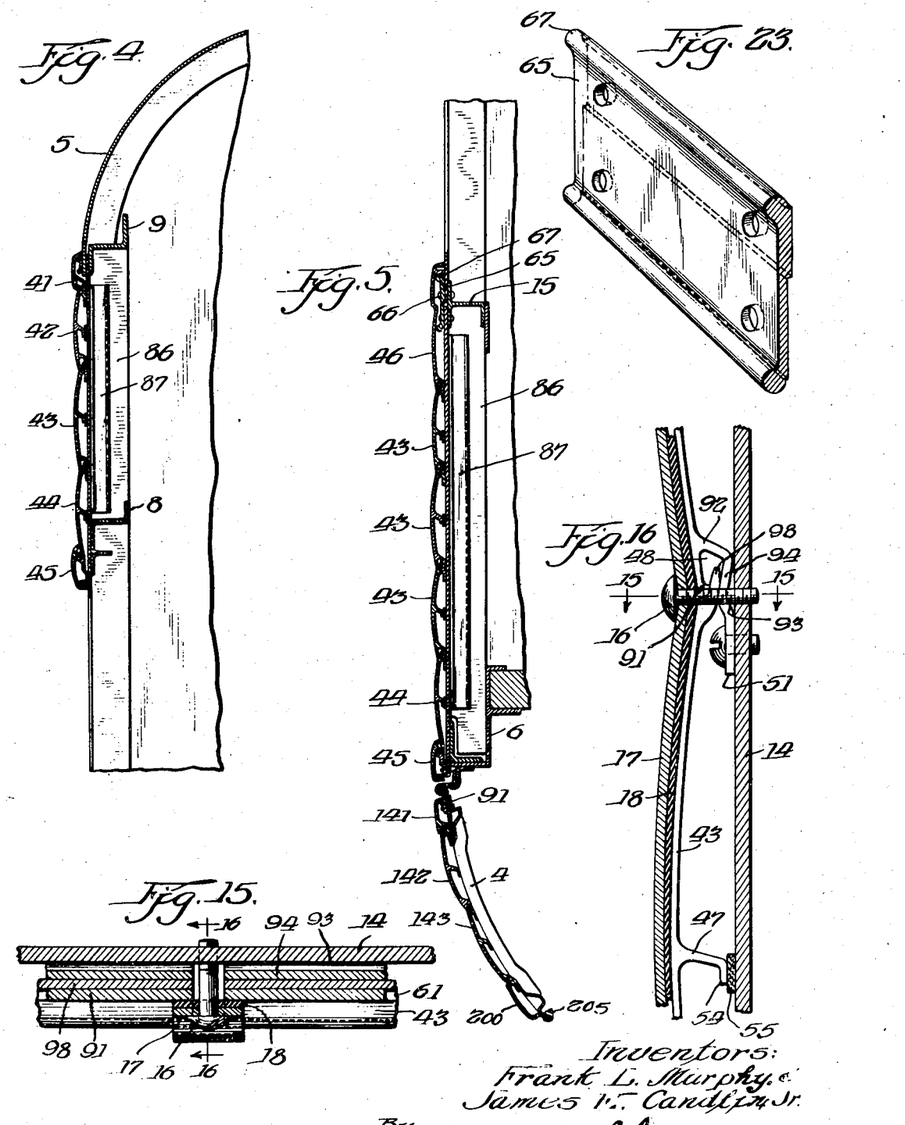
Figs. 4 and 5 are complemental vertical cross-sectional views taken respectively, on lines 4—4 and 5—5, of Fig. 1, through the vehicle side showing in Fig. 4 the application of the sheathing to the girder plate portion above the windows and, in Fig. 5, the sheathing attached to the girder plate beneath the windows, and to the apron framing depending from the vehicle side.
Fig. 15 is a horizontal sectional view taken on line 15—15, of Figs. 1 and 16, showing the method of splicing the sheathing members at points intermediate the vestibule and the opposite ends of the vehicle and securing them to the girder plate.
Fig. 16 is a vertical section through the splice taken on line 16—16, of Fig. 15, showing a continuous sealing strip between the sheathing members and the splice plate.
Fig. 23 is a fragmentary portion of the belt rail longitudinal formed with a marginal upper portion thickened for assembly with the girder plate portion in the window area and shaped to retain the moulding integral with adjacent sheathing member, as shown in Fig. 8.
Figure 6:
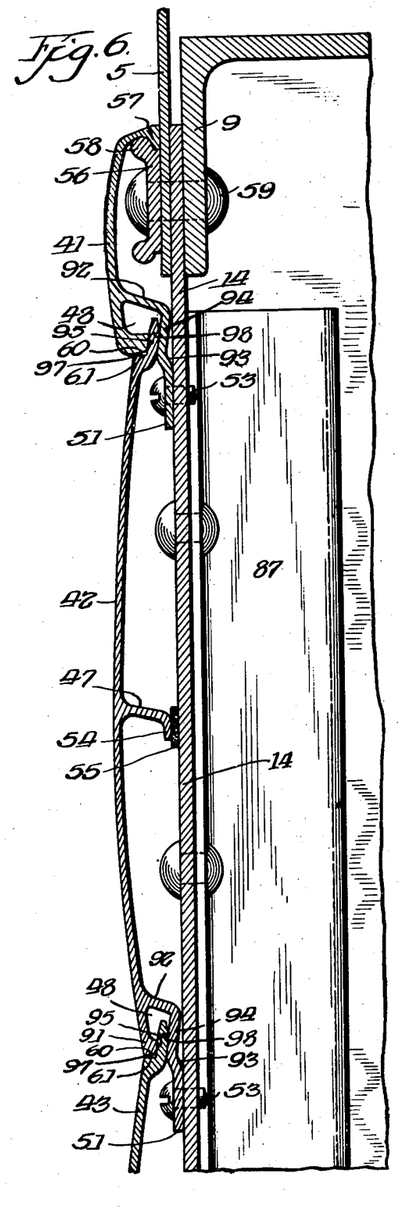
Figs. 6 and 7 are similar complemental views taken respectively on lines 6—6 and 7—7, of Fig. 3, showing enlarged that portion of the sheathing and plate girder side above the windows illustrated in Fig. 4, and depicting the manner of attaching the sheathing members to the girder plate and each other, at the side plate longitudinals and the window headers.
Figures 7, 24:
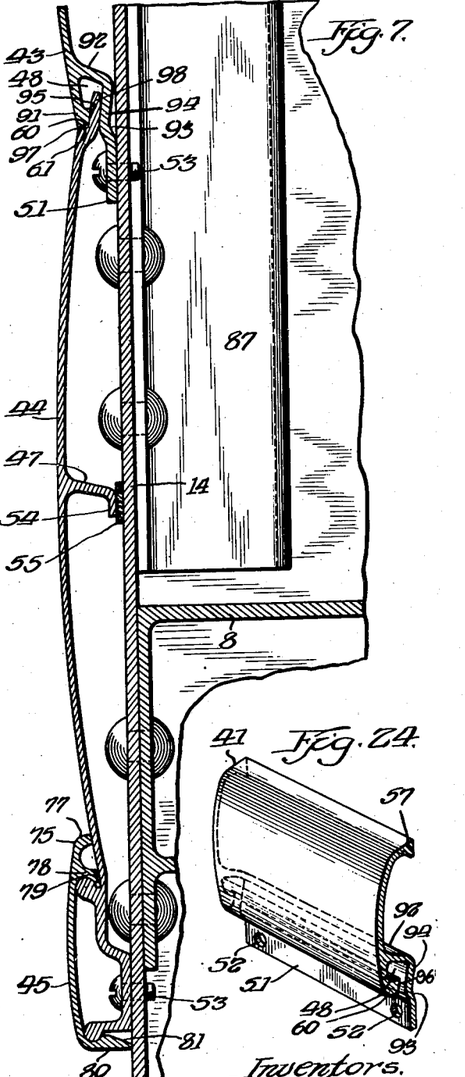
Fig. 24 shows a separate moulding member adapted for interlocking relationship with an associated sheathing member and the retaining strips of Fig. 18, shown assembled in Fig. 6 at the side plate position.

Certain of the sheathing members are formed to provide moulding trim pieces in the general assembly, such as the member 41 at the side plate framing longitudinal 9, member 45 at the window header framing longitudinal 8, the member 46 at the belt rail framing longitudinal 15, and the member 45 at the side sill framing longitudinal 6 but which may be adapted for use also at the window header position, as best shown in Figs. 4 and 7. The member 41 at the side plate is formed for attachment to a retaining strip 56, shown in detail in Fig. 18, with a depending securing lip 57 to engage the bulbous upper edge portion 58 of the retaining strip to which it is held when attached to the girder plate 14 by means of the attaching flange 51 at its lower margin as shown in Fig. 6. In the embodiment indicated the roof sheet 5 of the car is interposed between the retaining strip 56 and the girder and the side plate and secured by rivets 59, as shown. The outer wall of pocket 48 of this member 41 is formed with its lower portion shaped to provide a shoulder portion 60 adapted for engagement with the complemental ledge portion 61 on the underlying companion member 42 but is preferably inclined with respect to the ledge portion 61 to insure a proper seal with only line contact 97 between them under pressure developed by the tensioning of the underlying member by virtue of the stresses induced by the pressure of the struts 47 against the girder plate.

Figure 8:
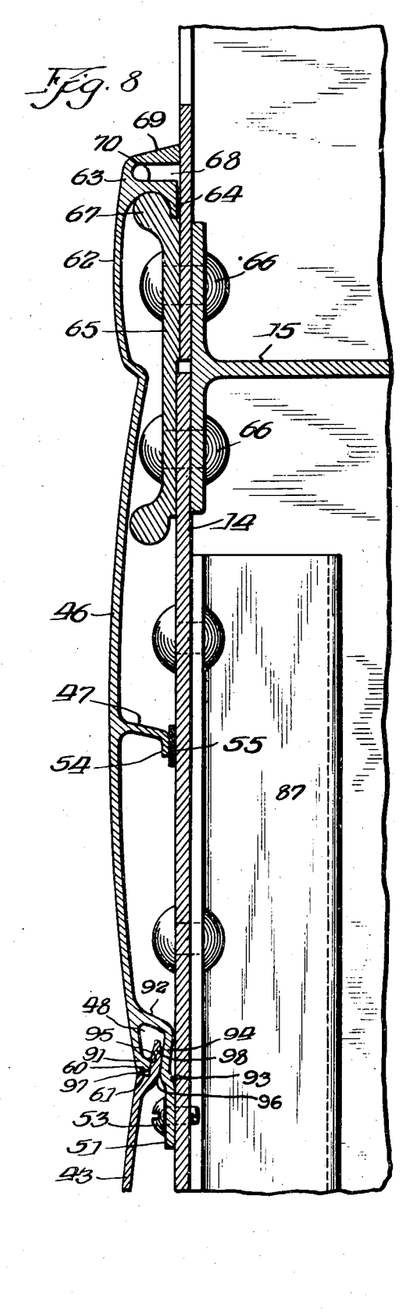
Figs. 8 and 9 are views similar to Figs. 6 and 7, but showing the portion of the plate girder side beneath the windows and the mode of attaching the sheathing to the girder plate at the belt rail and side sill positions and to associated sheathing members, the views being taken respectively on lines 8—8 and 9—9, of Fig. 1.
Figure 9:
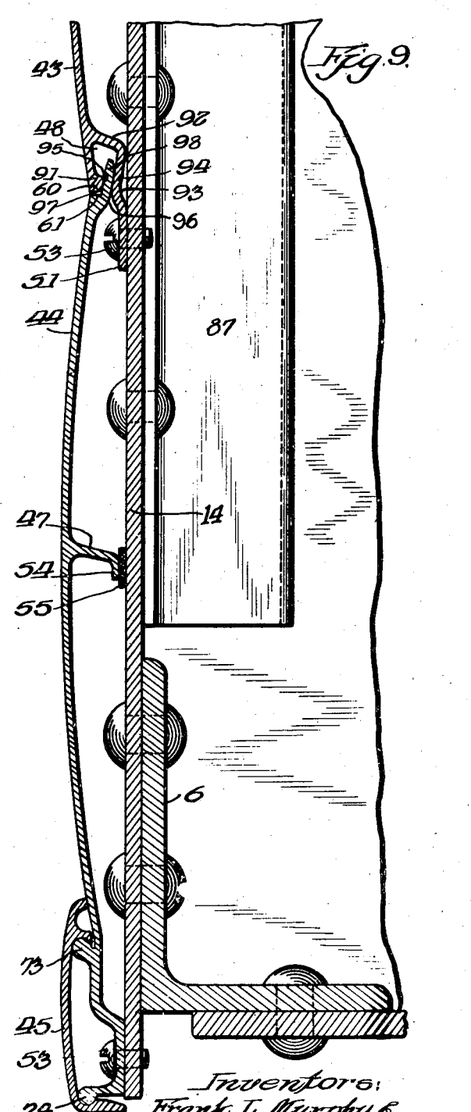

For the trim at the belt rail 15 the sheathing member 46 is formed with its upper margin shaped to provide a moulding portion 62 having a retaining flange 63 with a depending lip 64 adapted to engage the continuous belt rail strip piece 65 secured to the girder plate and the belt rail 15 by rivets 66, as shown in Fig. 8. The belt rail strip has a bulbous upper edge portion 67 with which the depending lip 64 engages to secure the upper portion of the sheathing member in position when that member is attached to the girder wall by means of the fastening means 53 along its lower margin through the attaching flanges 51 hereinbefore described, to prevent disengagement of the lip 64 from the belt rail strip. The flange 63 is preferably cored out as at 68 to provide an upper wall portion 69 and a lower wall 70 of lesser length from which the lip 64 depends so that upon engagement of the lip 64 with the retaining strip, the upper wall 69 alone will bear against the girder wall to provide a proper seal at that point to prevent seepage of water behind the moulding.

The members designated 43 are of like configuration, having each an upper margin formed with a flange 98 offset inwardly from the face of the member to provide the ledge portion 61, and a lower margin formed with a pocket 48 having its inner wall 94 extended downwardly to provide the attaching flange 51 and the downwardly extending outer wall portion 91 terminating in the shoulder portion 60. As will be understood, the flange 98 is entered under pressure between the walls of pockets 48 in the overlying member until the outer edge of the sloping ledge 61 contacts shoulder 60 of an adjacent member, after which the fastening devices 53 are entered in the openings 52 of the lower flange 51 to hold the member in position upon the girder wall, after which the flange 98 of an underlying member is entered in the pocket 48 of the instant member, covering the fastening devices 53, and in turn secured at its lower margin to the wall, and the operation repeated in attachment of the remaining members of the group until the car side wall above and below the windows has been covered.

Figures 10, 19, 20:
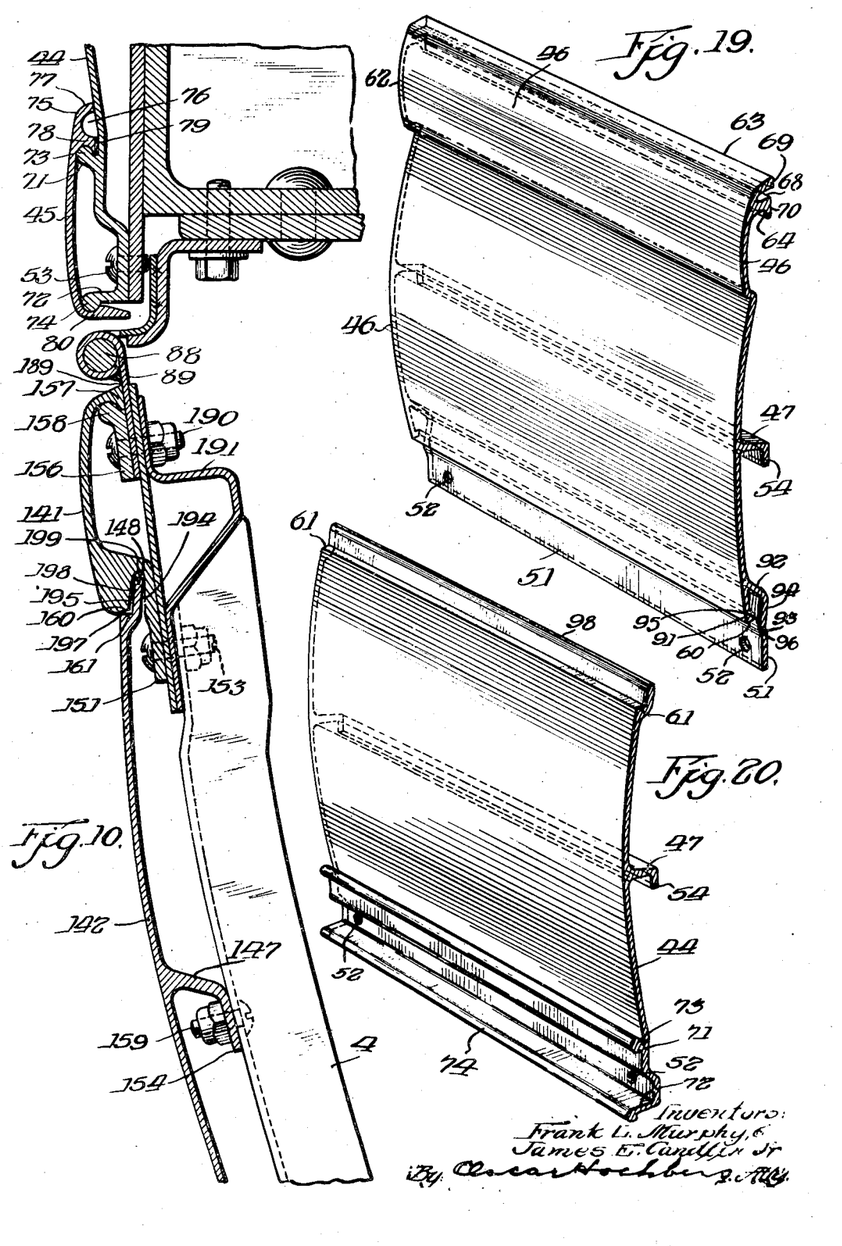
Figs. 10 and 11 are complemental vertical sectional views taken, respectively, on lines 10—10 and 11—11, of Fig. 1, showing the application of a modified form sheathing member to the apron framework and to companion members, and depicting in Fig. 10 a mode of suspending the apron from the vehicle side in a manner to avoid interference with adjacent sheathing portions at the side sill, and illustrating in Fig. 11, the form of attachment for the sheathing member at the free edge of the apron structure.
Figs. 19 and 20 show fragmentary perspective views of companion sheathing members for use in the interlocking relationship shown in Figs. 8 and 9, the upper member depicted in Figs. 8 and 19, being formed with a retaining moulding strip integral with the body of the sheathing member for engagement with the belt rail, with the associated underlying member shown in Figs. 9 and 20 formed at its lower margin for attachment to the girder plate at the side sill position and strip portions integral therewith for retaining snap-on moulding for concealing the sheathing fastening means, as shown in Figs. 9 and 10, or for use with the sheathing member at the window header position shown in Figs. 7 and 12.
Figures 17, 18:
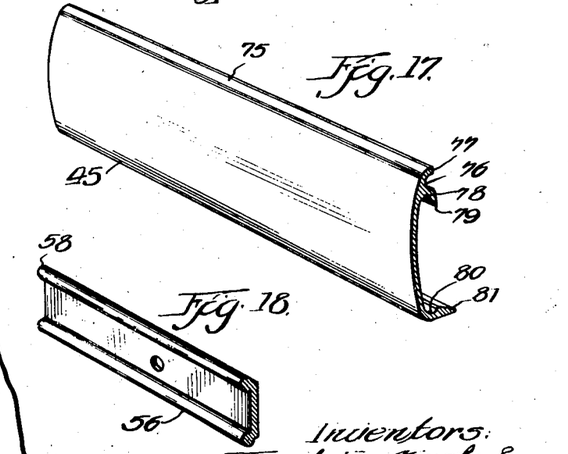
Fig. 17 is a fragmentary view in perspective of the type of snap-on moulding interchangeable for use with the sheathing member at the window header position as shown in Figs. 7 and 12, or in connection with the sheathing member at the side sill position as shown in Figs. 9 and 10.
Fig. 18 is a similar view of a strip for securing a sheathing member retaining moulding at the side plate position shown in Fig. 6, or interchangeably with the retaining strip for similar moulding used at the hinge position on the apron structure shown in Fig. 10.
Figure 25:
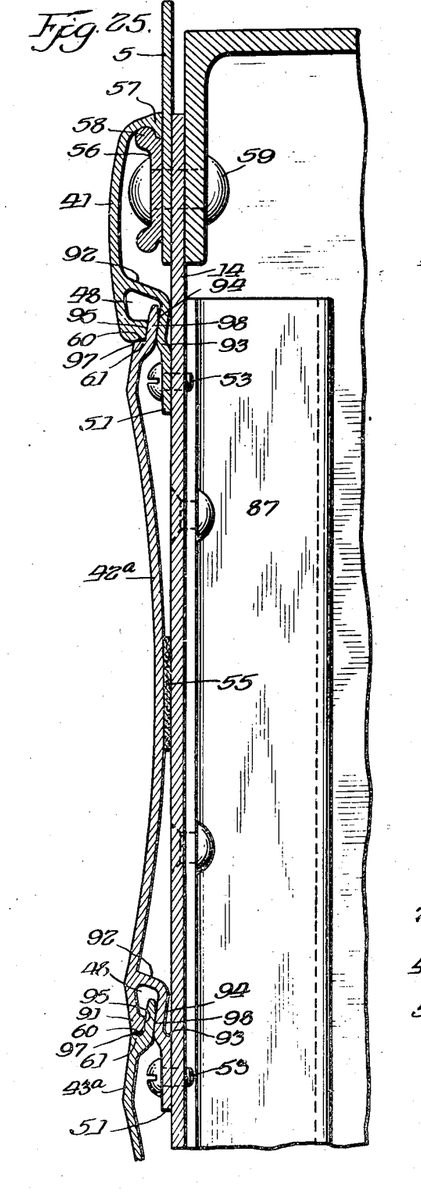
Figs. 25 and 26 are views respectively similar to Figs. 6 and 9, but showing the configuration of the body portion of the sheathing members modified to present a concave sheathing surface with that portion of the member curving inwardly for bearing contact with the girder.
Figure 26:
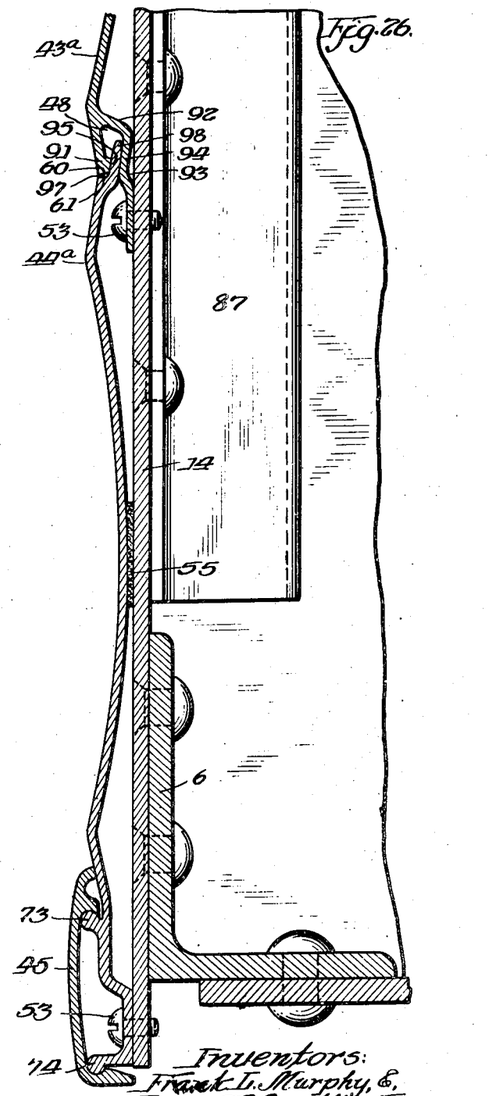

The moulding trim 45 for sheathing members 44 used interchangeably at both window header and side sill positions and shown in Fig. 17 is of the snap-on variety. The members 44 are formed at their lower margins with outwardly projecting ribs 71 and 72 having bulbous edges 73 and 74, respectively, designed to retain in position the trim pieces 45, as shown in Figs. 10 and 12. The pieces 45 are formed at their upper margins with flanges 75 cored out as at 76 to provide an upper wall portion 77 adapted for sealing contact with the curved face of the member 44 and a lower wall 78 having a depending lip portion 79 for engaging the retaining rib 71; along their lower margins said trim pieces 45 are formed with locking flanges having shoulders 80 engageable with the bulb portion 74 of the rib 72 to hold the retaining lip 79 upon the flange 71, the flanges having tapered portions 81 adapted to ride over the retaining bulbs 74 in the process of assembling, the flanges being sprung outwardly within the elastic limit of the section after which the locking flanges are restored to a normal locking position with their shoulder portions 80 embracing the retaining bulb 74 against displacement and with sufficient pressure to avoid chattering of the parts. As in the case of the moulding trim portion 62 of the sheathing member 46, the upper wall portion 77 only of the upper flange 75 of trim moulding 45 will bear against the member wall to insure proper water seal at the upper edge of the moulding.

Figure 3:
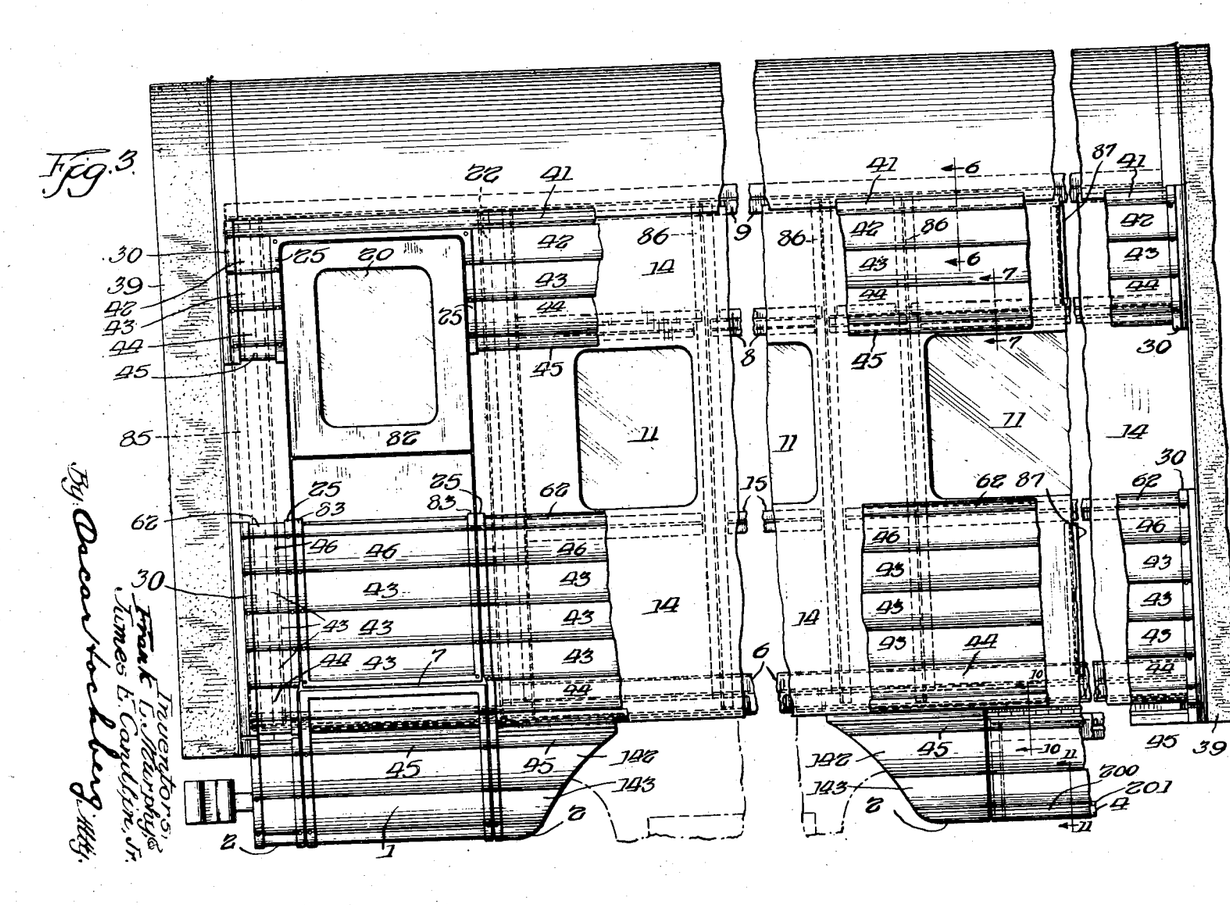
Fig. 3 is a view similar to Figs. 1 and 2, showing in enlarged fragmentary view the vestibule end on the near side of the vehicle and the opposite end with portions of the sheathing broken away to expose the underlying plate girder side wall of the vehicle with portions of the girder plate itself broken away to show framing longitudinals above and below the windows.
Figure 13:
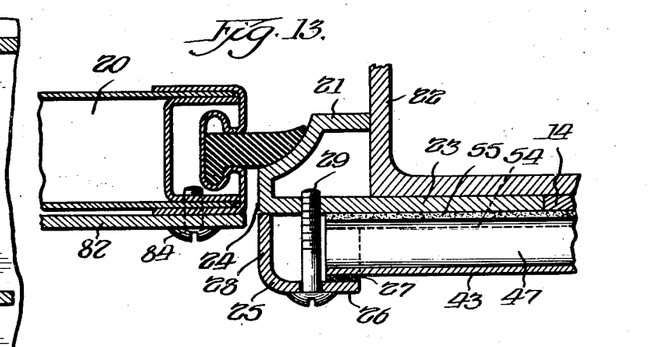
Figs. 13 and 14 show the method of securing the sheathing members at the vestibule door end and the corner post position at the opposite end of the vehicle, respectively, Fig. 13 being a horizontal sectional view taken on line 13—13, of Fig. 1, and Fig. 14 a similar view on line 14—14, of Fig. 2.
Figure 14:
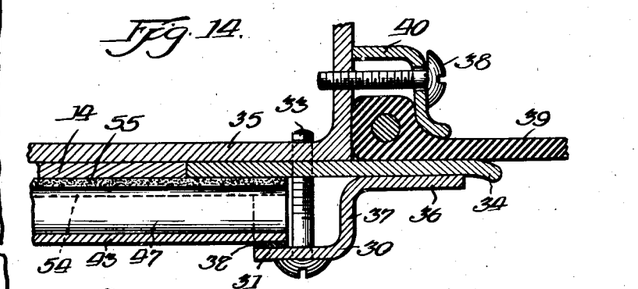

If desired, the sheathing arrangement may be extended to cover the aluminum vestibule door 20 as shown in Figs. 1, 3 and 13. For this purpose, only that portion of the door area below the window line need be covered with shaped members to accord with those on the car side beneath the windows and the remaining surface of the door covered preferably by flat panel plates 82 of the same material and finish as that characterizing the shaped members and the panel plates 13 covering the wall between the windows or the door surface treated to provide such finish, so that these areas of the car side will present an appearance in conformity with that afforded by the sheathing members. The shaped members on the door 20 may be virtual extensions of the members 46 and 43 on the car wall and secured to the door by retaining clamp members 83 similar to the clamp members 25 for the body sheathing as shown in Fig. 13, while the panels 82 may be secured by screws or bolts 84 as indicated in that figure. That portion of the car side between the vestibule door opening 24 and adjacent end, may be covered by sheathing members disposed to correspond to placement of like sheathing members on the body of the car above and below the windows with relatively short sections of the members 42 through 44, and the lower group members 46, 43 and 44, secured by the clamp members 25 and 30 shown in Figs. 13 and 14. The wall area between such members may be covered by flat panel plates 85 of like material and finish in harmony with the corresponding plates 13 and 82 hereinbefore referred to or the wall surface may be treated to conform to the finish on the extruded sheathing members.

Upon engagement with the girder wall as described, with strut rib portions 47 inducing tension in the respective sheathing members when attached to the wall plate 14, the several members function to rigidify the respective girder plate portions between the framing side posts 86 in areas above and below the windows and between said posts and the corner posts 22 and 35, respectively. Such application of the members to the girder plate 14 would permit of substantial reduction in the thickness of the girder plate if of aluminium or lighter gauge sheets when steel girders are used. If necessary, stiffeners 87, intermediate the posts above and below the windows, may be secured to the girder on its inner face to further stiffen the wall structure, effecting substantial reduction in weight and amount of material required without disturbing the integrity of the structure as a whole.

Stress sheathing members of the type used to cover the body of the car may be adapted for paneling of the apron framing 4 depending from the car sides, as best shown in Figs. 1, 2, 3, 5, 10 and 11. The structure between the trucks 3 is pivotally suspended from the body by hinges 88, as in Fig. 10, and with the sections 2 of the apron fixed to car body on opposite sides of the trucks as shown. To the framing 4 of the apron, sheathing members having outer surface configuration similar to the moulding members 41 at the side plate may be used at the upper margin of the apron as shown at 141 in Figs. 5 and 10; the sections would differ in the spacing of holes 152 to register with spacing of the apron supporting frame members 4. The upper margin is formed with a depending lip portion 157 to engage the protruding upper edge 158 of retaining strip 156 attached to the hinge leaf 189 by means of the bolts 190 taking also the apron longitudinals 191. The moulding formation along its lower margin may be of a modified design as shown in these figures to provide elongated pockets 148 presented downwardly and defined by diverging inner and outer walls 194 and 195, respectively, with the inner wall 194 being extended downwardly to provide attaching flanges 151 for securing the member to the apron framing longitudinal 191 and the verticals 4 by means of bolts or screws 153, as best shown in Fig. 10. As in the preferred form shown in Fig. 6, the moulding outer surface portion extends to the lower margin of the member to a shoulder portion 160 presented downwardly but inwardly and upwardly inclined with respect to cooperating ledge portion 161 on the associate underlying sheathing member to provide edge contact at the seam 197, as above outlined with reference to the preferred form.

Figures 11, 21, 22:
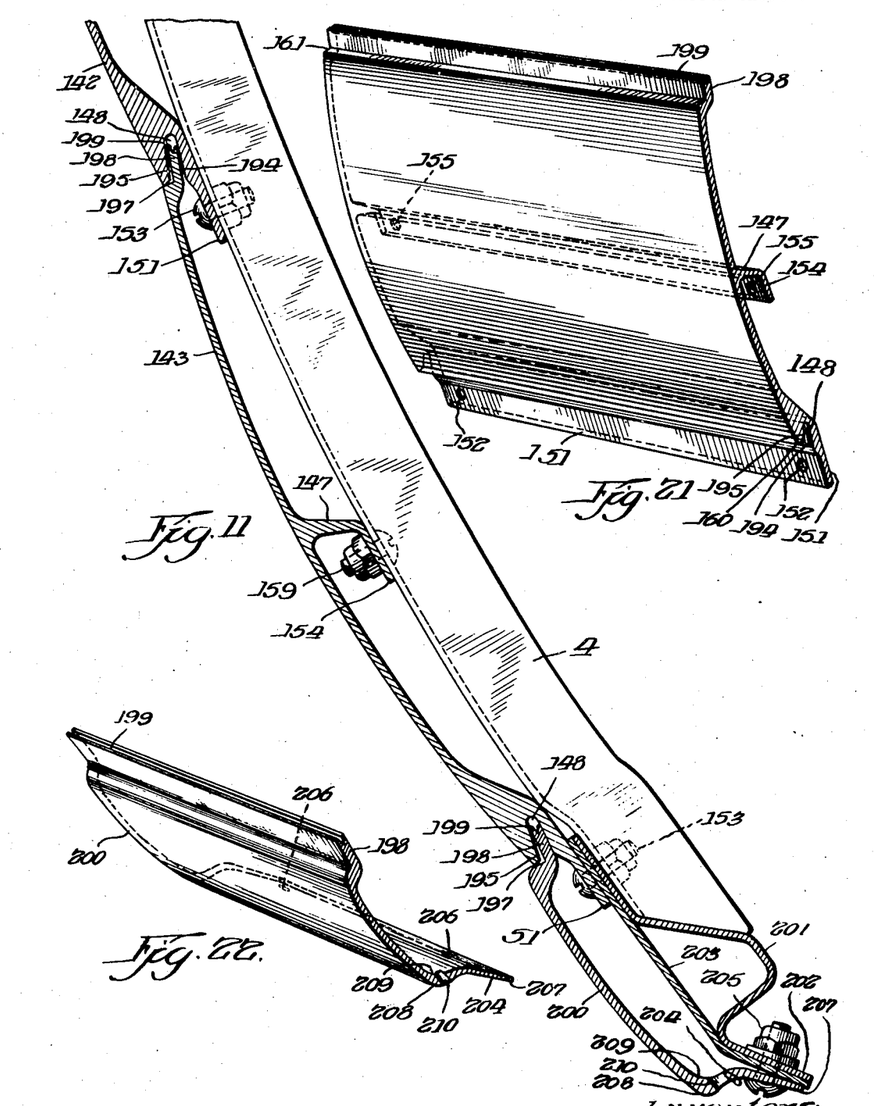
Figs. 21 and 22 show complemental sheathing members designed for application to the apron structure and arranged for interlocking relationship with each other and the associated members, as indicated in Fig. 11, and showing the manner of shaping the member of Fig. 22 to provide resiliency at the fastening means to insure tension in the member to provide thrusting engagement with the companion piece.

The underlying sheathing member 142 is formed at its upper margin with an upstanding flange 198 preferably bifurcated as shown at 199 for a purpose hereinafter described; the flange is offset on the member to provide a ledge portion 161 extending therefrom to the face of said member at which point line contact with inclined shoulder 160 on the overlying section 141 to provide the closed seam 197 between the members, is effected. The bifurcation 199 on flange 198 is intended to provide a measure of resiliency to the flange at its edge and permit a slight wedging action of the flange within the pocket 148 due to the yielding upon contact of the bifurcation branches with respective converging side walls 194 and 195 of the pocket under thrust of assembling the sections in interlocking relationship during the process of attaching them to the wall 14. As in the construction of the members secured to the girder 14, the sections are formed with tensioning strut portions 147 having bearing flanges 154 which, when used for application to the framing members as in the embodiment shown, are provided with holes 155 to receive fastening devices 159 extending through said flanges 154 and the apron framing verticals 4. The lower margin of this member 142 is formed with an elongated pocket portion 148 having a configuration similar to that of the overlying moulding section with inner and outer side wall portions 194 and 195 converging downwardly with an attaching flange portion 151 extending downwardly from the inner wall for securing the member to the framing, as best shown in Figs. 11 and 21. As in the preferred form the outer face of the member extends downwardly to terminate in a downwardly presented shoulder 160 disposed inwardly and upwardly to permit line contact with ledge portion 161 on adjoining underlying member 143 to form a tight seam 197 at the meeting faces of said members in the manner hereinbefore indicated. The underlying sheathing member 143 shown in Fig. 11, is similar to member 142 and further description thereof is not deemed necessary.

The sheathing assembly on the apron framing is completed with the application of the trim moulding member 200 shown in interlocking relationship with the overlying member in Fig. 11 and in fragmentary detail in Fig. 22. The member is formed along its upper margin with offset interlocking flange 198 having its free edge bifurcated as at 199 for wedging engagement with pocket 148 in the overlying member as hereinbefore outlined with respect to the interlocking joints between other members of the assembly; the lower margin however, differs in form from the other members to adapt it for connection to the lower framing longitudinal 201. As best shown in Fig. 11, the framing member 201 is formed with a lower flange portion 202 bent inwardly of the plane of the base plate portion 203 of the longitudinal for a purpose presently to be described. Trim member 200 terminates in a lower flange portion 204 extending downwardly and inwardly from the face of the member for connection with flange 202 of the framing longitudinal 201 by means of the securing bolts 205 taking both flanges through the holes 206, as shown in Fig. 11; the flange 204 of the trim section is disposed at an angle with respect to the flange 202 on the framing longitudinal 201 when held by the bolts 205 so that only the edge 207 of the flange 204 will contact the adjacent face of flange 202 to allow a limited yield of the section flange under pressure of the securing bolt 205 to exert sufficient thrust of the section edgewise as to produce a wedging interlock between the bifurcated flange 198 of the section and the adjacent pocket 148 of the overlying member 143, as will be understood. To obtain the widest possible outer face portion for the section, that section of flange 204 between the face of the section and the fastening means is extended downwardly as at 208 to conceal the fastening means from a side view of the car, and to prevent accumulation of water in the trough 209 resulting from the bulge thus created, drain holes 210 may be drilled at intervals throughout the length of the section.

Side aprons constructed as above described with preformed sheathing members detachably secured in stressed interlocking relation directly to the apron framing members 4, as shown, are substantially strengthened against distortion by the rigidifying action of the stress inducing strut portion of the members between the upper and lower trim moulding sections 141 and 200, depicted in Figs. 10 and 11 and 21, respectively.

To extend the benefits of the sheathing system to areas beneath the trap door 7 at the vestibules of the car, the underside of the retractible steps 1, having a contour shaped to conform to the curvature of the fixed apron sections 2 flanking the steps, may be fitted with sheathing members corresponding, preferably, in kind and number to those on the apron sections to lend continuity to the sheathing in the treatment of the whole car side as shown in Figs. 1 and 3.

It will be noted that the stressing means for the several sheathing members, other than trim sections, has been indicated as in the form of strut ribs 47 extending inwardly from the body of the sections for pressure bearing against the girder side, but conceivably, the desired stressing of the members may be obtained by a mere reversal of the curvature of the body portion between the margins of the members $42^a$, $43^a$ and $44^a$, so that the body of each of the sections will be curved inwardly to present a concave surface and so proportioned as to insure bearing contact of such inwardly curved portion and the shim 55 on the contiguous face of the girder 14 to insure proper interlocking relationship between the adjoining members to provide tight joints under thrust of the sections when attached to the girder side, as will be obvious.

The construction hereinbefore outlined permits application of the sheathing from the outside without disturbing interior finish and facilitates removal and replacement of damaged sections. From the foregoing description it is evident that the members with their respective tensioning means are to be so proportioned and the operative parts so disposed that upon assembling the members with their respective flanges entered in the pockets of adjacent overlying members the tensioning means portion of the members will engage the vehicle wall and the attaching flanges initially spaced from the wall so as to require the application of pressure slightly to flex the members to cause the attaching flanges to bear against the wall in position to permit the member fastening means to be applied.

What is claimed is:

1. In a vehicle wall construction including a girder, a sheathing member having flange and pocket marginal portions adapted for interlocking relationship with respectively adjacent pocket and flange portions on associate members, member attaching means depending from said pocket, and a shaped portion intermediate said marginal flange and pocket elements having a configuration providing member tensioning means operative upon securement of the member by said attaching means, said shaped portion of the member extending inwardly of the respective marginal portions of said member for effecting operative engagement with said girder.

2. In a vehicle wall construction including a girder, a sheathing member having flange and pocket marginal portions adapted for interlocking relationship with the respectively adjacent pocket and flange portions on associate members, a member attaching means depending from said pocket, and a curved portion intermediate said marginal flange and pocket elements having a configuration providing member contact with said girder and operative upon securement of the member by said attaching means to effect edgewise thrusting engagement with the associate members.

3. In vehicle wall construction including vertical and longitudinally extending body framing members, girder plates connecting said members, and a plurality of sheathing members extending longitudinally of the vehicle secured to said girder plates disposed in interlocking marginal relationship, means for attaching the sheathing to the vehicle wall, and means on said sheathing intermediate the margins of the respective members for effecting engagement with said girder plates and operative to rigidify said girder plates upon securement of the sheathing to said plates.

4. In a wall sheathing assembly, a sheathing member having flange and pocket marginal portions adapted for itnerlocking joint relationship with respectively adjacent pocket and flange portions on associate members, said pockets having each an outer wall portion terminating at the lower margin of the member and an integral inner wall portion extending inwardly from the inner face of said outer wall to a point adjacent the attaching plane of the sheathing, thence downwardly to extend below the pocket to provide an attaching flange, said walls being spaced apart to form a passageway to receive the contiguous flange on the adjacent underlying member, and strut means projecting inwardly from the inner face of said member intermediate said flange and pocket marginal portions operative upon securement of the member to the wall at said attaching flange to exert pressure at the joint between respectively adjacent flange and pocket elements.

5. As an article of manufacture for use in a vehicle wall assembly, a shaped extruded metal sheathing member having a configuration providing an elongated offset upstanding flange portion along its upper margin, an elongated flange receiving pocket portion along its lower margin, an offset resilient attaching flange portion extending downwardly from the inner side of said pocket, and member stressing means intermediate of and parallel to said upper and lower margins and below said upper marginal flange portion, said flange and pocket portions being adapted for interlocking joint relationship with respectively adjacent members having like characteristics.

6. In a sheathing assembly for vehicle walls, a plurality of shaped prefabricated members having each an elongated upstanding offset flange portion adapted for interlocking joint relationship with overlying associate members along an upper margin, integral bulbous member retaining ribs along a lower margin coextensive with said member, snap-on trim moulding elements removably engaging said ribs, member attaching means detachably securing said sheathing to the vehicle wall, and member tensioning means intermediate said upper and lower margins operative upon securement of the sheathing by said attaching means.

7. In a sheathing assembly for vehicle walls, a sheathing member having an upper offset marginal flange portion and a lower marginal elongated pocket portion for interlocking joint relationship with the respectively adjacent pocket and flange portions on the associate sheathing members, an upper ledge portion extending inwardly from the outer face of the member to the base of said flange, said member outer face portion extending downwardly and terminating in a thickened bead portion to form the outer wall of said pocket, and an inner wall portion for said pocket extending inwardly from said outer wall at a point above the bead to a plane adjacent the vehicle wall thence downwardly to provide an attaching flange portion depending from the inner side of said pocket, said bead portion of the pocket outer wall having a downwardly presented shoulder sloping inwardly and upwardly with respect to the contiguous upper ledge portion on the adjacent underlying member to provide line contact at the junction of said members.

8. In a sheathing assembly for vehicles, a sheathing member having an upstanding bifurcated upper flange portion and a lower marginal elongated pocket portion for interlocking joint relationship with the respectively adjacent pocket and flange portions on the associate sheathing members, an upper ledge portion extending inwardly from the outer face of the member to the base of said flange, said member outer face portion extending downwardly to form the outer wall for the pocket and terminating in a downwardly presented shoulder inclined inwardly and upwardly with respect to the contiguous upper ledge portion on the adjacent underlying member to provide line contact at the junction of said members, said pocket having an inner wall portion disposed in converging relationship with the outer wall and extending downwardly below the pocket to provide attaching means with the space between said walls so proportioned with respect to the thickness of the contiguous bifurcated flange on the adjacent underlying member as to cause the branches of the bifurcation to yield upon contact with the respective converging side walls of said pocket to produce a wedging action under thrust of assembling said members for securement to the wall by said attaching means, and tensioning means on said members.

9. In a vehicle wall construction including a girder, a sheathing member having flange and pocket marginal portions adapted for interlocking relationship with the respectively adjacent pocket and flange portions on associate members, a member attaching means depending from said pocket, and an inwardly curved portion intermediate said marginal flange and pocket elements providing member contact with said girder and operative upon securement of the member by said attaching means to effect edgewise thrusting engagement with the associate members.

FRANK L. MURPHY.
JAMES E. CANDLIN, Jr.

REFERENCES CITED

The following references are of record in the file of this patent:

UNITED STATES PATENTS

| Number | Name | Date |
|--------|------|------|
| 376,926 | Thuener | Jan. 24, 1888 |
| 745,000 | Coffield | Nov. 24, 1903 |
| 978,834 | Bonness | Dec. 20, 1910 |
| 1,250,551 | Brooks | Dec. 18, 1917 |
| 2,129,235 | Ragsdale et al. | Sept. 6, 1938 |
| 2,150,130 | Ragsdale et al. | Mar. 7, 1939 |
| 2,250,764 | Hoess | July 29, 1941 |
| 2,277,791 | Small | Mar. 31, 1942 |